United States Patent
Gregg et al.

(10) Patent No.: US 10,528,626 B2
(45) Date of Patent: Jan. 7, 2020

(54) DOCUMENT PROCESSING

(71) Applicant: INTUIT INC., Mountain View, CA (US)

(72) Inventors: Roger John Gregg, Surry Hills (AU); Mark Barrington John Harrison, Surrey Hills (AU); David Savage, Surrey Hills (AU); Craig Ernest Mitchell, Surrey Hills (AU)

(73) Assignee: INTUIT INC., Mountain View, CA (US)

( * ) Notice: Subject to any disclaimer, the term of this patent is extended or adjusted under 35 U.S.C. 154(b) by 120 days.

(21) Appl. No.: 14/383,871

(22) PCT Filed: Mar. 19, 2013

(86) PCT No.: PCT/AU2013/000274
§ 371 (c)(1),
(2) Date: Sep. 8, 2014

(87) PCT Pub. No.: WO2013/138851
PCT Pub. Date: Sep. 26, 2013

(65) Prior Publication Data
US 2015/0039707 A1 Feb. 5, 2015

(30) Foreign Application Priority Data

Mar. 19, 2012 (AU) .................... 2012901095

(51) Int. Cl.
*G06F 16/93* (2019.01)
*G06F 16/958* (2019.01)
*H04L 12/58* (2006.01)

(52) U.S. Cl.
CPC ........... *G06F 16/93* (2019.01); *G06F 16/986* (2019.01); *H04L 51/08* (2013.01)

(58) Field of Classification Search
None
See application file for complete search history.

(56) References Cited

U.S. PATENT DOCUMENTS

| 5,416,849 | A | * | 5/1995 | Huang | ................ | G06K 9/2054 |
| | | | | | | 358/403 |
| 6,651,217 | B1 | * | 11/2003 | Kennedy | ............... | G06F 17/243 |
| | | | | | | 715/224 |

(Continued)

FOREIGN PATENT DOCUMENTS

| CN | 1687926 A | 10/2005 |
| EP | 1594072 A2 | 11/2005 |

(Continued)

OTHER PUBLICATIONS

Chinese Office Action dated Jun. 30, 2016 for Application No. 2013800251357.

(Continued)

*Primary Examiner* — Sargon N Nano
*Assistant Examiner* — Christopher B Robinson
(74) *Attorney, Agent, or Firm* — Patterson + Sheridan, LLP

(57) ABSTRACT

The disclosure concerns systems and methods for extracting data from documents. A computer receives a message from a sender. The message has the electronic document and an electronic address of the sender. Based on the address of the sender the computer selects a map that comprises location data of data fields and determines values of the data fields by extracting data from the electronic document using the location data of the selected map. Since the computer selects the map based on the address of the sender the computer does not need to rely on the content of the electronic (Continued)

document to select the correct map to use, which makes the selection less prone to errors and the method can be used with existing email systems.

20 Claims, 12 Drawing Sheets

(56) References Cited

U.S. PATENT DOCUMENTS

| | | | | |
|---|---|---|---|---|
| 7,200,551 | B1* | 4/2007 | Senez | G06Q 20/10 705/35 |
| 2005/0036169 | A1* | 2/2005 | Kia | G06F 3/03545 358/1.15 |
| 2006/0136812 | A1* | 6/2006 | Jones | G06F 17/2205 715/240 |
| 2007/0174306 | A1* | 7/2007 | Gibson | G06F 17/2247 |
| 2008/0168347 | A1* | 7/2008 | Hallyn | G06Q 10/107 715/700 |
| 2009/0106370 | A1* | 4/2009 | Dreyfus | H04L 51/00 709/206 |
| 2009/0234818 | A1* | 9/2009 | Lobo | G06F 17/2725 |
| 2010/0202698 | A1* | 8/2010 | Schmidtler | G06K 9/00469 382/195 |
| 2012/0314954 | A1* | 12/2012 | Moore | G06K 9/00449 382/182 |
| 2013/0060684 | A1* | 3/2013 | Oskolkov | G06Q 10/10 705/40 |
| 2013/0343658 | A1* | 12/2013 | Dejean | G06K 9/00463 382/203 |

FOREIGN PATENT DOCUMENTS

| | | | | |
|---|---|---|---|---|
| WO | WO 2012028978 | A1 * | 3/2012 | ....... G06F 17/30914 |
| WO | WO-2012028978 | A1 * | 3/2012 | ............. G06F 16/84 |

OTHER PUBLICATIONS

Chinese Office Action dated Mar. 2, 2017 for Application No. 201380025135.7.

* cited by examiner

300

310 →
```
<text top="237" left="581" width="72" height="8" font="1"><b>INVOICE NUMBER</b></text>       312
<text top="251" left="581" width="6" height="10" font="0">4</text>       314
```

320 →
```
<text top="440" left="101" width="33" height="8" font="1"><b>ITEM ID </b></text>
<text top="440" left="173" width="56" height="8" font="1"><b>DESCRIPTION</b></text>
<text top="440" left="389" width="42" height="8" font="1"><b>QUANTITY</b></text>
<text top="440" left="461" width="19" height="8" font="1"><b>UNIT</b></text>
<text top="440" left="533" width="47" height="8" font="1"><b>UNIT PRICE</b></text>       321
<text top="440" left="605" width="17" height="8" font="1"><b>TAX</b></text>
<text top="440" left="716" width="104" height="8" font="1"><b>TOTAL AUD EXCL. TAXES</b></text>
```

330 →
```
<text top="463" left="101" width="32" height="10" font="0">SC719</text>
<text top="463" left="173" width="92" height="10" font="0">7" 19-gauge screws</text>
<text top="463" left="389" width="26" height="10" font="0">5,000</text>
<text top="463" left="461" width="16" height="10" font="0">pcs</text>       331
<text top="463" left="533" width="20" height="10" font="0">0.04</text>
<text top="463" left="605" width="21" height="10" font="0">10%</text>
<text top="463" left="789" width="32" height="10" font="0">200.00</text>
```

340 →
```
<text top="486" left="101" width="32" height="10" font="0">SC515</text>
<text top="486" left="173" width="92" height="10" font="0">5" 15-gauge screws</text>
<text top="486" left="389" width="32" height="10" font="0">10,000</text>
<text top="486" left="461" width="16" height="10" font="0">pcs</text>       341
<text top="486" left="533" width="20" height="10" font="0">0.03</text>
<text top="486" left="605" width="21" height="10" font="0">10%</text>
<text top="486" left="789" width="32" height="10" font="0">300.00</text>
```

<GEN>
  <LIHDR text="ITEM ID." x="101" y="440" dx="33" dy="8"/>    ← 410
  <FRLI text="SC719" x="101" y="463" dx="28" dy="10"/>
</GEN>
<HDR>                                             424  425
                                        422  423        ↘  421
  <INVNUM label="INVOICE NUMBER" lx="581" ly="237" ldx="72" text="4" x="581" y="251" dx="5" dy="10"/>   420
  <INVDATE label="ISSUE DATE" lx="701" ly="237" ldx="50" ldy="8" text="11/17/11" x="701" y="251" dx="35" dy="10"/>
  <SUPPNAME text="Con Tact" x="341" y="250" dx="64" dy="14"/>
  <PURORDNUM label="ORDER/REQ. NO" lx="581" ly="326" ldx="67" ldy="8" text="76145" x="581" y="340" dx="24" dy="10"/>
  <DUEDATE label="PAYMENT DUE DATE" lx="701" ly="281" ldx="85" ldy="8" text="12/29/11" x="701" y="295" dx="35" dy="10"/>
</HDR>
<LI>
  <ITEMNUM text="SC719" x="101" y="463" dx="28" dy="10"/>
  <DESCR text="7 inch 19-gauge screws" x="173" y="463" dx="92" dy="10"/>          ← 430
  <QTY text="5,000" x="389" y="463" dx="26" dy="10"/>
  <UNITEXCL text="0.04" x="533" y="463" dx="20" dy="10"/>
  <AMTEXCL text="200.00" x="789" y="463" dx="32" dy="10"/>
  <TAXIND text="10%" x="605" y="463" dx="21" dy="10"/>
</LI>
<FTR>
  <GDSATTR label="Subtotal excl. taxes" lx="533" ly="513" ldx="85" ldy="9" text="500.00" x="791" y="514" dx="30" dy="9"/>
  <TAXAMT label="VAT 10%" lx="533" ly="529" ldx="19" ldy="41" text="50.00" x="797" y="530" dx="24" dy="9"/>   ← 440
  <TOTAMTINCL label="Total AUD" lx="533" ly="551" ldx="65" ldy="12" text="550.00" x="779" y="551" dx="41" dy="12"/>
</FTR>
```

| Invoice Field | Value |
|---|---|
| Invoice Number | 790 |
| Invoice Date | 26 Jan 2012 |
| Goods | $ 55.00 |
| GST | $ 5.50 |
| Invoice Total | $ 60.50 |
| Supplier ABN | 99 999 777 777 |
| Line Item #1 | 20 x 777777 = $40.00 |
| Line Item #2 | 10 x 888888 = $15.00 |

Supplier [dropdown] —1502
+ —1504

Supplier name: Soft Drinks Co.    Add New Supplier
Alt Supplier name:
Supplier ABN: 99 999 777 777

OK    Cancel

Fig. 15

New Supplier

Country: AUSTRALIA
Supplier ABN: 99 999 777 777
Company Names: ABN Not Found
Preferred Name: Soft Drinks Co.
Supplier card:
Supplier group:
Default GL Code:

OK    Cancel

Fig. 16

DOCUMENT PROCESSING

TECHNICAL FIELD

The disclosure concerns computing systems for processing documents, that is extracting data from documents. The disclosure includes a description of methods, computer systems and software.

BACKGROUND ART

With the computerisation of business processes, documents are handled in electronic form, such as image files from scanner devices. In almost all cases the format of documents varies between suppliers and it is difficult to extract the required data from the file.

Most companies, and in particular companies that buy goods or services from a large number of suppliers, are faced with the problem of processing a large number of different invoices.

Any discussion of documents, acts, materials, devices, articles or the like which has been included in the present specification is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

In a first aspect there is provided a computer implemented method for extracting data from an electronic document having document data, the method comprising:
 (a) receiving a message from a sender, the message having the electronic document and an electronic address of the sender of the message;
 (b) based on the address of the sender, selecting one of a plurality of maps comprising location data of data fields;
 (c) determining values of the data fields of the selected map by extracting data from the electronic document based on the location data of the selected map; and
 (d) storing the values of the data fields on a data store.

It is an advantage that the map is selected based on the address of the sender. As a result, the method does not need to rely on the content of the electronic document to select the correct map to use. Also, by relying on the electronic address of the sender, the selection of the map is less prone to errors than when using the content of the electronic document. Also, the method can be used with existing methods of sending documents, such as email, meaning that the method does not require any additional information or customisation allowing for easy integration with current document communication systems.

The electronic document may comprise location data of invoice elements and wherein the method comprises:
 determining whether the location data of at least one document element and the location data of at least one data field of the selected map identify the same location; and
 if the location data of at least one document element and the location data of at least one data field of the selected map identify the same location, determining the value of the at least one data field of the selected map by extracting document data from the at least one document element.

It is an advantage that by determining whether the location data identifies the same location multiple maps may be used for a particular document. As a result, a map that is not appropriate for that document simply gives no result and the next map can be used.

The electronic address may be an email address. The electronic address may be a fax number.

The electronic document may be a structured document. It is an advantage that structured documents are standardised and processors for these documents are widely available. As a result, the access of location data in the file is simplified.

The electronic document may be an XML document and the document elements may be XML elements comprising the location data.

The maps may be XML maps.

Selecting one of a plurality of maps may comprise selecting, based on the address of the sender, a subset of maps from the plurality of maps. It is an advantage that a subset of maps is selected. As a result, the method can be performed where a forwarding server is used and the address of the sender does not unambiguously identify the map. That way, all maps associated with the address of the forwarding server are selected.

The method may comprise:
 receiving the message for a first recipient; and
 receiving the plurality of maps from other recipients, such that the first recipient is not one of the other recipients.
 It is an advantage that maps are selected that are received from other recipients. As a result, the maps of many recipients are shared and the map for documents of an issuer needs to be created only once by any of the recipients.

The message may have a recipient address and selecting one of a plurality of maps is based on the recipient address. It is an advantage that the map is selected based on the address of the recipient. As a result, different recipients can have different maps for the same sender. This allows each recipient to extract different data from documents from the same sender.

In a second aspect there is provided a computer system for extracting data from an electronic document having document data, the system comprising:
 one or more communications ports;
 one or more processors to operate to
  receive at the communications port a message from a sender, the message having the electronic document and an electronic address of the sender of the message,
  based on the address of the sender, select one of a plurality of maps comprising location data of data fields, and
  determine values of the data fields of the selected map by extracting data from the electronic document based on the location data of the selected map; and
 one or more data stores to store the values of the data fields associated with the document.

In a third, aspect there is provided software, that is, computer readable instructions recorded on computer readable media, that when executed by a computer causes the computer to perform the method described directly above.

In a fourth aspect there is provided a computer implemented method for creating a map for extracting data from an electronic document, the method comprising:

receiving a message from a sender, the message having the electronic document and an electronic address of the sender of the message;

causing the electronic document to be displayed a user;

receiving from the user a selection of one or more data fields;

determining location data associated with each data field;

storing as the map the location data associated with each of the one or more data fields together with an association to the address of the sender.

In a fifth aspect a computer system for creating a map for extracting data from an electronic document, the system comprising:

one or more communications ports;

one or more processors to operate to to receive a message from a sender, the message having the electronic document and an electronic address of the sender of the message;

to cause the electronic document to be displayed a user;

to receive from the user a selection of one or more data fields;

to determine location data associated with each data field; and one or more data stores to store as the map the location data associated with each of the one or more data fields together with an association to the address of the sender.

In a sixth aspect there is provided software, that is, computer readable instructions recorded on computer readable media, that when executed by a computer causes the computer to perform the method of the method described directly above.

Optional features of the first aspect set out above are also optional features of the other aspects where appropriate.

BRIEF DESCRIPTION OF DRAWINGS

Examples will now be described with reference to the accompanying drawings in which:

FIG. 3 illustrates XML code of a document.

FIG. 4 illustrates XML code 400 of a map.

FIGS. 9 to 16 illustrate graphical interfaces for creating a map.

BEST MODE FOR CARRYING OUT THE INVENTION

Figure 1:
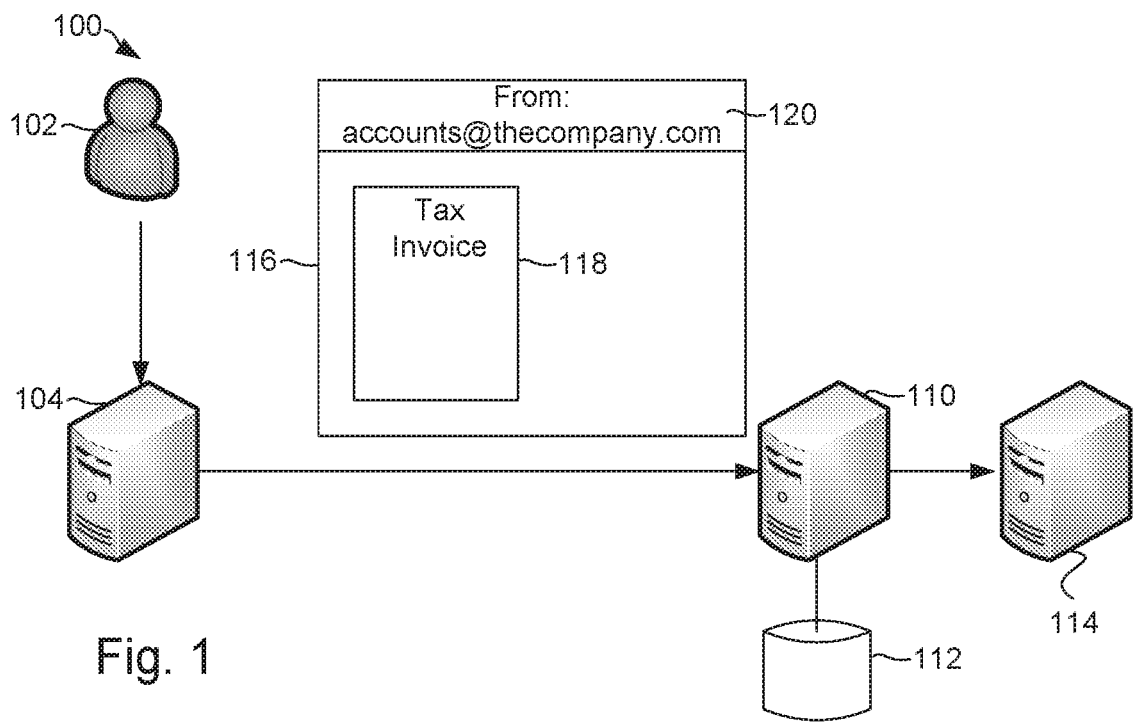
FIG. 1 illustrates a system for document processing.

FIG. 1 illustrates a system 100 for extracting data from a document, in this example an invoice, comprising an issuer 102, such as a company that issues the invoice, and a issuer server 104. The issuer server 104 is connected via a computer network, such as the Internet, to a processing server 110. The processing server 110 is connected to datastore 112, such as by local area network or the Internet. The processing server 110 is also connected to accounts payable server 114.

In other examples, the processing server 110 is connected to an inventory or ERP system. In yet another example, the connections between the servers are via USB or by sending a memory card from one server to another.

Although the following examples describe various embodiments of extracting data from an invoice, the same statements equally apply to any other document that has document data, such as credit note, financial statement, purchase order, delivery docket, filled in forms, or packing slip.

FIG. 1 also illustrates an electronic message 116 that has an invoice 118. In one example, the message 116 is an email and the invoice 118 is an electronic document in pdf format that is attached to the email. In one alternative, the document may be a structured text file or a graphic, such as the image of an invoice. In another example, the invoice is a plain text message in the body of the email. The invoice is any document that can contain invoice data that can be displayed, that is rendered, printed or otherwise displayed in a repeatable way that all invoice data value in the invoice each can be identified by its geometric location in that display.

In one example geometric location or location data is a pixel coordinate taken from the top left or right corner of the rendered invoice or a pixel offset from a predetermined reference location. In a different example, geometric location or location data refers to a descriptive wording such as "top left" or "at the top and quarter of the width to the right". In a different example, geometric location or location data refers to a pixel coordinate that is an offset from a descriptive wording or an invoice data value, both of which themselves may be a geometric location or location data. That location must be repeatable, that is the same data value must be identifiable at the same location when displayed in the same way.

In yet another example, the message 116 is a fax comprising the invoice 118 as a graphic that is sent as the fax. It would be apparent to the skilled person that any other electronic message could have an invoice, such as a message sent from a mobile that includes a document and the sender address is the sender mobile phone number.

The message has associated with it a sender address 120, such as an email address or a fax number captured within the message or as metadata associated with the message. In this example, the sender address 120 is the email address of the issuer 102. In other examples, the sender address 120 is different to the address of the issuer 102, such as the address of a forwarding server as described further below. The invoice may be sent through many email addresses before it reaches the processing server 110, and the sender address is the last email address in the chain.

In one example incoming faxes are digitised by a fax server, which may be a third party fax server, a fax server provided by the sender of the fax, or a fax server provided by the provider of the processing server. The incoming fax is converted to an email with one or more images attached, which are the invoices or the pages of invoices. The sender fax number or another type of sender address created by the fax server, such as a unique identifier, may be included within the body of the email or in the subject line of the email.

In a further application, the system may present one or more of these images to the user of the system to allow the user to split images from each other (forming multiple invoices) and/or allow the user to group images together (forming multi-page invoices).

In another example, the system may then allow the user to manually enter the invoice data, read from the image, into the system if the system is unable to extract the data from the image.

In another example, the system may allow the user to route these images to another data extraction system (which may be external to the system) that will convert the images to structured documents, such as an optical character recognition (OCR) or an intelligent character recognition (ICR) process. The converted document may then be returned to the system.

In another example, the system may additionally allow the user to route these images to a process workflow that employs the use of human operators to manually enter the data from the images into the system.

In another example, when the processing server receives an image in a message, the processing server automatically converts the image to a structured document employing OCR, ICR or some other method.

In one example, the processing server 110 is located with other servers in a recipient's server infrastructure. In a different example, processing server 110 is a virtual server being executed alongside other virtual servers on one of the recipient's processors, or the server is a software that is executed on the same operating system as other services of the recipient. In yet a different example, the processing server is located at the premises of a processing service provider and is connected to the accounts payable server 114 via a computer network, such as the Internet. Alternative types of connections may also be used, such as wireless networks or data transport by memory card.

When in use, the issuer 102 issues the invoice 118 and places the invoice onto the issuer server 104 using standard accounting software running on issuer server 104. The issuer server 104 embeds the invoice 118 into the message 116 and sends the message to processing server 110.

In a different example the issuer 102 logs onto the processing server 110 and generates the invoice from within the processing server 110. The processing server 110 sends the invoice to customers which may have an account with the processing server 110. The server maintains an address for each issuer 102 that has the ability to log onto the processing server and generate invoices in this way. In this way the message that is sent to the customer that includes the invoice is sent from an address associated with that issuer the invoice.

After receiving the message 116, the processing server performs the method of FIG. 3 for extracting data from an invoice. That is, the processing server 110 reads the sender address and accesses datastore 112 to select a map that is associated with that sender address. In one example this association between maps and sender addresses is created by the recipient of the invoice. The processing server 110 applies the map to the invoice 118 to extract the invoice data and saves the invoice data to the data store 112. In a different example the recipient associates multiple maps with a sender address and the processing server 110 iterates through these multiple maps to find the one that suits the format of the particular invoice.

When the data extraction is complete, the processing server 112 sends the extracted data to the accounts payable server 114 so that the invoice is paid or otherwise processed by an accounts payable department. In one example, the extracted data converted into one specific XML structure as required by accounts payable server 114, such that the data is sent to the accounts payable server 114 in the same format regardless of the format of the received invoice. The accounts payable server 114 may be an ERP with an accounts payable server attached, or it could be a stand-alone ERP, or it could be an inventory system, or another type of system. Alternatively, once the data extraction is complete the data and the invoice flagged for approval in the system. Once approved by a user (and possible the extracted data edited), the user chooses when to send the data to the accounts payable server 114.

Figure 2:
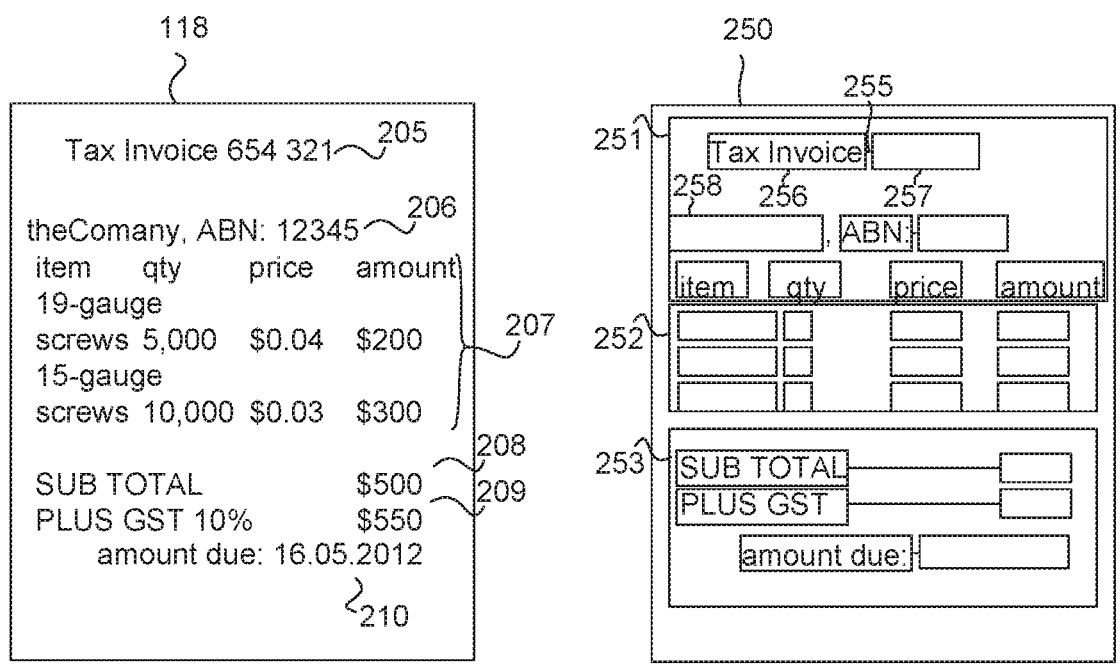
FIG. 2 illustrates an invoice in more detail and a rendered display of a map.

FIG. 2 illustrates an invoice 118 in more detail and a rendered display of a map 250. The invoice 118 is one example of an invoice and it is to be understood that a wide range of different formats and data fields present in invoices currently are used. It is a problem with existing technologies that the extraction of data from the invoices is not accurate due to the wide range of different formats of invoices.

In this example, the invoice 118 comprises data field values for invoice number 205, the name and business number 206 of the invoicing company, that is the issuer 102, items as shown in the list 207 of items, a sub total amount 208, a goods and services tax (GST) amount 209 and a due date 210.

A map is a set of definitions, such as using XML, of data fields including location data, such as coordinates, for each data field. Using the location data a map may be rendered for displaying the map to a user, such as the rendered display of map 250 in FIG. 2. The map 250 comprises three parts, a header part 251, an item part 252 and a footer part 253. Each invoice from the same issuer may have a different number of items listed and therefore a different length of the item list. Therefore, the header part 251 is of fixed size and fixed location, the item part 252 is of variable size and fixed location and the footer part 253 is of fixed size and variable location.

The map 250 comprises a number of data fields, such as invoice number field 255. The invoice number field 255 comprises an invoice number label field 256 and an invoice number value field 257. The label is a text identifier that does not change between different invoices from the same issuer and is used to locate and verify the value in the value field 257, which defines the data of interest in an invoice and is typically of a different value in different invoices.

Some data fields, such as company name field 258 do not comprise a label field and only the value field. In this example the company name 206 is extracted from the invoice 118 for verification purposes although the company name does not change between invoices from the same company.

In this example, the item part 252 of the map 250 comprises only value fields in each item/row, that is four value fields for each item/row. Since the number of items changes between invoices, the number of rows is dynamically changed when applying the map. In this example the number of items is assumed to be the number of lines between the header part 251 and the footer part 253. However, some items in some invoices may occupy multiple lines while others only occupy one line. And in some scenarios some rows may not equate to actual line items, but rather may simply be instructions or non-critical or non-relevant text. In that case, more sophisticated rules need to be integrated into the method.

In one example the rules comprise certain criteria, such as for columns of an invoice, that are mandatory for a line to be considered a line, such as a number in the "price" column. If the information in a line does not match the criteria or the map fails to find information at those coordinates, then the line is ignored. Similarly, if data extracted from a column on a line is not considered to be in a format that is expected, then the line may be ignored.

In structured text documents, such as invoice 118, each text element, such as invoice number 205, is stored in the physical file as a text box that is associated with location data. The map 250 also has associated with each data field, such as invoice number field 255, location data. The location data of the data invoice number field 255 substantially matches the location data associated with the invoice number 205 on the invoice 118.

FIG. 3 illustrates XML code 300 of an example invoice comprising an invoice number section 310, a table headings section 320, a first item section 330 and a second item section 340. The invoice number statement 310 comprises an invoice number label element 312 and an invoice number value element 314. In this example, each element is associated with location data, being in form of pixel coordinates from the left and top borders of the document. Each element further includes the width and the height in pixels and optionally formatting information such as bold typeface of invoice number label element 312. It is noted that the elements comprise no identifier, such as an id="invno" XML parameter, and as a result, the elements cannot be located by searching the XML tree for the identifier.

The table headings section 320 comprises only label elements and no value elements. Each of the label elements of the table headings section 320 are associated with location data being a left-coordinate that is representative of the column this element is associated with. For example, the unit price label element 321 is associated with a column located 533 pixels from the left.

Unlike the table headings section 320, the first item section 330 and the second item section 340 comprise only value elements, for example the first item unit price value element 331. This element is located 533 pixels from the left and is therefore associated with the unit price label element 321. That way, each value element of the item sections 330 and 340 is associated with one label element of the table headings section 320 and this association is represented by the coordinates of the respective element.

In one example the XML code 300 is created using a third party tool, such as "pdftohtml" and the processing server 110 does not alter the XML.

FIG. 4 illustrates an extract of XML code 400 of a map populated extracted data. The code 400 comprises a generic part 410, a header part 420, an item part 430 and a footer part 440. In this example, the map has already been applied to the invoice. Before the map is applied to the invoice, the "text" value of the elements is empty. That is, the map is stored as XML on a data store. In another example, the map is stored on a data base as records comprising field information including location data.

The header part 420 includes an invoice number data field 421 that defines the coordinates 422 and 423 of the invoice number label field and the coordinates 424 and 425 of the invoice number value field. In this example the x-coordinate in the map 400 corresponds to the left-coordinate in the invoice 300 and the y-coordinate in the map 400 corresponds to the top-coordinate in the invoice 300.

Item part 430 includes a unit price data field with x-coordinate 533 and therefore, this element corresponds to the unit price value element 331 of invoice 300 having the same number as the left-coordinate. That way, the map specifies the coordinates of the label and value elements in the XML file of the invoice and a processor can locate the data fields in the invoice using the map.

Typically, the layout of the invoice is different between different issuers. As a result, a map is specific to one particular issuer (although the issuer may have more than one sender address) and when an invoice is received, the issuer needs to be determined in order to select the appropriate map out of a potentially large set of existing maps. On the other hand, if a map is applied to an invoice and the map is not appropriate for that issuer, the result of the mapping will be a mapping error. The chances that a not appropriate map extracts incorrect data instead of a mapping error is very low. As a result, it is possible to try a set of different maps for one invoice and only one map of the set of maps will generate no mapping error.

Figure 5:
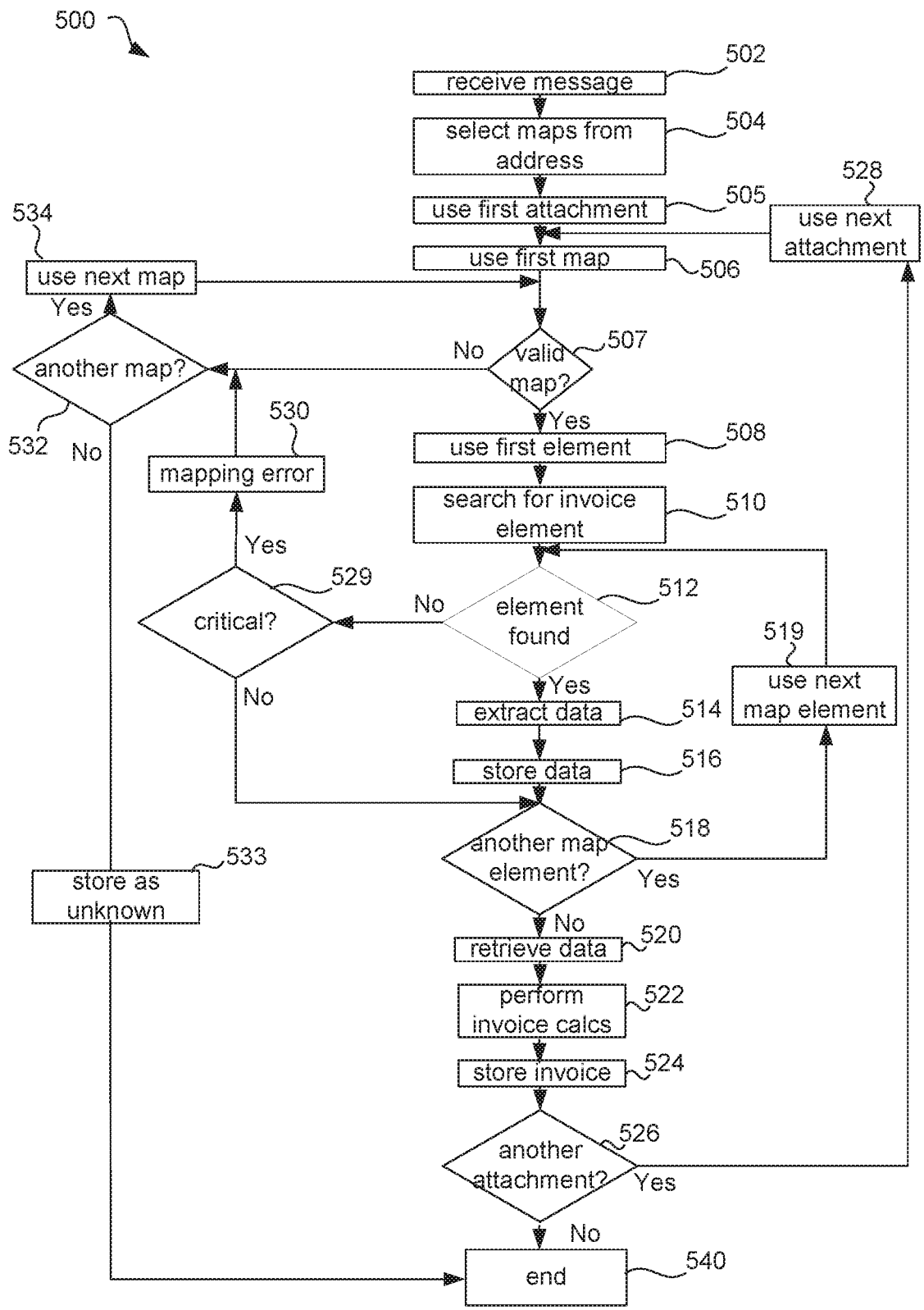
FIG. 5 illustrates a method for extracting data from a document.

FIG. 5 illustrates a method 500 for extracting data from an invoice performed by a processing serer. The method 500 commences by receiving 502 a message either directly or indirectly from an issuer as described with reference to FIG. 1. The message includes as an attachment the invoice as an electronic document and an electronic address of the sender, such as an email address. In one example, the invoice is a structured document, such as a structured document type like PDF, for example, which is then converted to XML using a third party tool, such as "pdftohtml", by the processing server 110. The document may also be a different format, such as Microsoft Word (.doc) format and is converted either first to PDF and then to XML or directly from .doc to XML.

In a different example the document is an XML document that is either included in the message body as plain text or attached to the message as a text file or as a compressed text file. Receiving the invoice also comprises generating a new invoice identifier such that the data extracted from that invoice can by associated with that invoice using the invoice identifier. The invoice identifier is a number generated and automatically incremented by the data base, such that each invoice identifier is associated with exactly one invoice. The method 500 then selects 504 based on the electronic address of the sender a map or set of maps that are associated with that sender.

In one example, the maps are stored on a data store in a data base, such as SQL. In the data store one or more email addresses are associated with that map. Determining a map based on the address of the sender comprises performing a data base query with the address as the query parameter, such that all maps associated with that address are returned. A person skilled in the art will appreciate that other means of storing the maps associated with email addresses are possible, such as storing each map and email address in a text file or a text field in one record of the SQL data base with the email address being stored in a different field of the same record.

In another example the maps are associated with the sender address as well as the recipient address. In this case, the query also includes the recipients address such that only those maps are returned that the particular recipient has identified to be associated with this particular sender.

In one example, the invoice is received directly from the issuer and there is one single map associated with the issuer's address. In a different example of the same scenario, multiple maps are associated with the issuer address, such as one map for a credit note, one map for a service invoice and one map for a line item invoice. In a different example, several different issuers send invoices for a single recipient to a single mailbox of the recipient on a forwarding server. The forwarding server sends these invoices to the processing server. As a result, all invoices from different issuers include the same sender address, that is the address of the forwarding server. The address of the mailbox on the forwarding server is not necessarily uniquely associated with the recipient, such that two different recipients can use the same forwarding server. In this case, the recipient specifies a number of maps, one map for each issuer. The method 500 then selects based on the address included in the message a subset of maps comprising all maps of that recipient for different issuers.

In one example the message includes multiple attachments and the method uses 505 the first attachment. The method then continues by selecting 506 a first map of the subset of maps. The first maps that are tried are maps that the recipient has identified as being preferred maps and that the recipient wants to try to use each time from that sender. If those have failed, the processing server 110 will try the other maps that were previously used for that sender address but not identified as being preferred The method 500 determines 507 whether this map is a valid map. If the map is not a valid map, the method checks 532 whether there is another map available and continues with using 534 the next map. If the map is found to be valid the method 500 continues with using 508 the first data field of the map. The method 500 accesses the location data of the data field and searches 510 for an element within the invoice such that the location data, that is the coordinates, of the data field of the map and the location data of the element of the invoice identify the same location, that is they refer to the same location. In one example, identifying the same location means that the coordinates are numerically identical. In another example, identifying the same location means that the coordinates differ not more than a predetermined threshold, such as two pixels.

In another example the method determines from map 400 an implied delta offset between the x-coordinates of the invoice number value field 424 and the invoice number label field 422 and vice versa for the y-coordinate, that is in terms of reference numerals this delta offset is {(424–422), (425–423)}.

A map 400 is applied to invoice 300 and if there is a label such as 421 "INVOICE NUMBER" in 312 then the method looks for a value to correspond with the label.

The method takes the coordinates of the label it has found a match for and adds to it the delta offset, which it determines from the map. The method then takes the resulting coordinate and searches the XML code 300 for a value that overlaps that coordinate.

If only one value overlaps that coordinate, that will be the value selected. However, if more than one value overlaps that coordinate, then a second method is employed which takes the centre point coordinates into consideration. This is a more accurate but a slightly slower process. Based on the use of these two methods, a value is extracted.

If an element is found 512, the method 500 extracts 514 the data, that is the text in the value element of the invoice, and stores 516 the data on a temporary data store associated with the invoice, such as by storing the data in a SQL database and each data record contains the data and the invoice identifier. The data may be stored as a text string or cast to a different type such as an integer type. The method 500 then checks 518 whether there is another data field in the map that has not been processed. If there is another data field, the method 500 uses 519 the next map element and is repeated from step 510 using the location data of the next data field. If the check 518 determines that there is no other data field of the map the method 500 retrieves 520 the invoice data that has been stored on the temporary data store, such as computer RAM or a data base, performs 521 invoice calculations 522 (which may add to the extracted invoice data) and provided that those invoice calculations return a complete set of mandatory results, stores 524 the invoice data in a generic format, such as XML, on the data store.

In one example, storing the invoice data on a data store also comprises sending the invoice data to accounts payable server 114. Since the method 500 has now finished processing the current invoice, the method 500 checks 526 whether there is another document, such as an attachment, in the received message. If there is another attachment, the method 500 uses 528 the next attachment and returns to using 506 the first map.

Once all attachments are processed the method ends 540, and the system looks to the next received email for processing 502.

Once the data is successfully extracted and stored in a database on the data store, the data may be accessed by querying the data store. In one example, a subsequent process performs a query for all data associated with a particular invoice identifier, such as "SELECT * IN INVOICE_DATA WHERE INVOICE_ID=123456". The subsequent process receives the data of this invoice, creates an XML message from the data in a standard format and sends the XML message to an accounts payable server or some other external system.

If the search does not find 512 a matching element within the invoice the method checks 529 whether the element of the map is critical. If the element is not critical, the method continues with checking 518 whether there is another map element. If the current map element is critical, the method issues 530 a mapping error. This means that the currently used map is not appropriate for this invoice. In some examples, there is not a one-to-one relationship between the invoice element and the data field of the map. This is the case if the same invoice element is included into the invoice more than once. In this case, the method compares the two instances and if the extracted data of the two instances is the same, the method proceeds as normal. If the extracted data of the two instances differs, the method issues a mapping error. In another case, the same data field has been included into the map more than once. In this case, the method is simply repeated for all instances of the data field.

The method checks 532 whether there is another map in the subset of maps that may be tried. If there is another map the method 500 uses 534 the next map and the method 500 is repeated from step 508 using the first data field of the next map. If there is no other map the method stores 533 the invoice on the data store as an unknown invoice and ends 540. As a result, the method 500 tries all maps in the subset of maps that are associated to the sender's email address until one map results in a positive mapping result, that is no mapping error. The stored unknown invoices are then processed by an operator as described below with reference to FIGS. 9 to 16.

Figure 6:
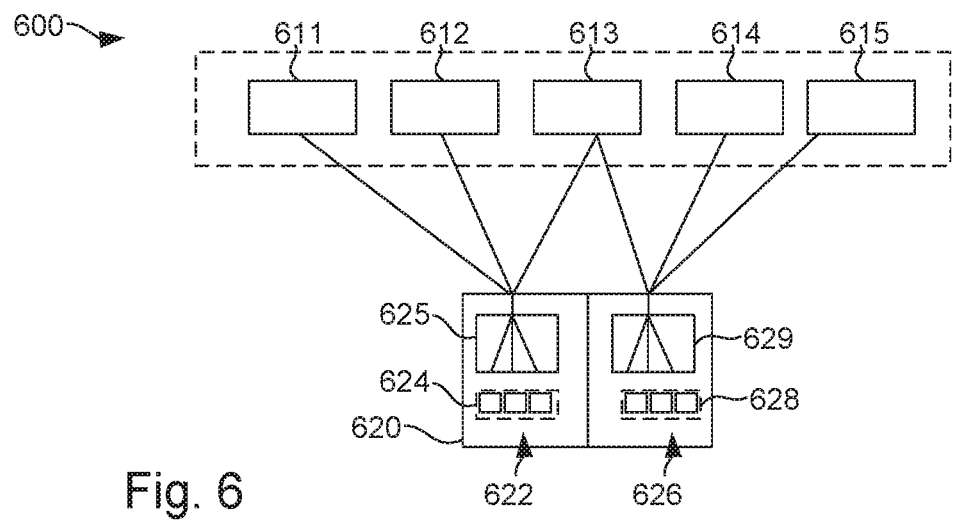
FIG. 6 illustrates a computer network.

FIG. 6 illustrates a computer network 600 comprising five invoice issuers 611 to 615 and a processing server 620. A person skilled in the art will appreciate that the processing may be distributed over a number of servers that each may be a separate physical machine or hosted as virtual servers on one single or multiple physical machines or hosted by a cloud computing service provider. The processing server 620 hosts a first inbox 622 with an associated first datastore 624 storing a first set of three maps, that are represented by XML code as described with reference to FIG. 4. The processing server further comprises a first processor 625 executing software installed on datastore 624 for selecting one or more maps from the datastore 624 to process the invoice as described with reference to FIG. 5.

Similarly, the processing server 620 hosts a second inbox 626 with an associated datastore 628 storing a second set of three maps and a second processor 629 executing software installed on datastore 628 for selecting one or more maps from the datastore 628. Of course, the processing server may host more than two inboxes, such as 1,000.

Each issuer is associated with one email address, such as accounts@issuer_a.com, and each inbox is also associated with one email address, such as recipient_a@invoiceserver.com. In this example, both inboxes 622 and 626 have the same hostname, that is the part after the '@'-symbol. Each map on data stores 624 and 628 is associated with one email address of an issuer, such that the processors 625 and 629 can select the appropriate map based on the address of an email message including the invoice.

The association between email addresses and maps on data stores 624 and 628 is provided by the recipient, that may be represented by an administrator user, who approves an issuer as a supplier and identifies a map that the recipient wishes to associate with the issuer's address.

In this example, the first three issuers 611 to 613 send invoices to the first inbox 622 while the last three issuers 613 to 615 send invoices to the second inbox 626. As a result, issuer 613 sends invoices to both inboxes 622 and 626. The processors 625 and 629 select the appropriate map based on the issuers email address.

In this example, a first recipient associated with the first inbox 622 requires different information from the invoice from issuer 613 than a second recipient associated with second inbox 626. As a result, the map selected by the first processor 625 and the map selected by the second processor 629 are different.

In a different example, the two recipients require the same information and the duplication of the maps is not optimal.

Figure 7:
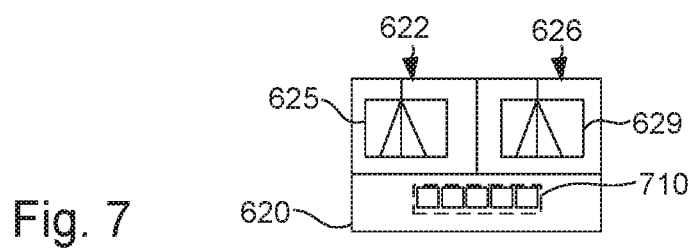
FIG. 7 illustrates another example of the processing server from FIG. 6.

FIG. 7 illustrates another example of the processing server 620 from FIG. 6. Instead of one data store for each inbox, processing server 620 comprises only one common data store 710 that stores all the maps of all recipients. In one example, an invoice is received from an issuer for which the corresponding recipient has not yet created a map but a different recipient has created a map for this issuer. By sharing the maps between different recipients, the map is created once by one recipient and then shared with other recipients.

In another example, a common part of the map that is required by all recipients is shared between the recipients, such as a map for the invoice number and the sub total amount. In this case, each recipient has an additional part for each partly shared map that defines the special fields that are required by that recipient individually. The map may also be created automatically, such as based on probability, and the recipient confirms that the map that has been created is accurate.

In yet another example processor 625 first uses a map from data store 624 for the first recipient and if the use of the map on data store 624 results in an error or the processor 625 did not find a map on data store 624, the processor 625 searches for a map in data store 628 of the second recipient.

Figure 8:
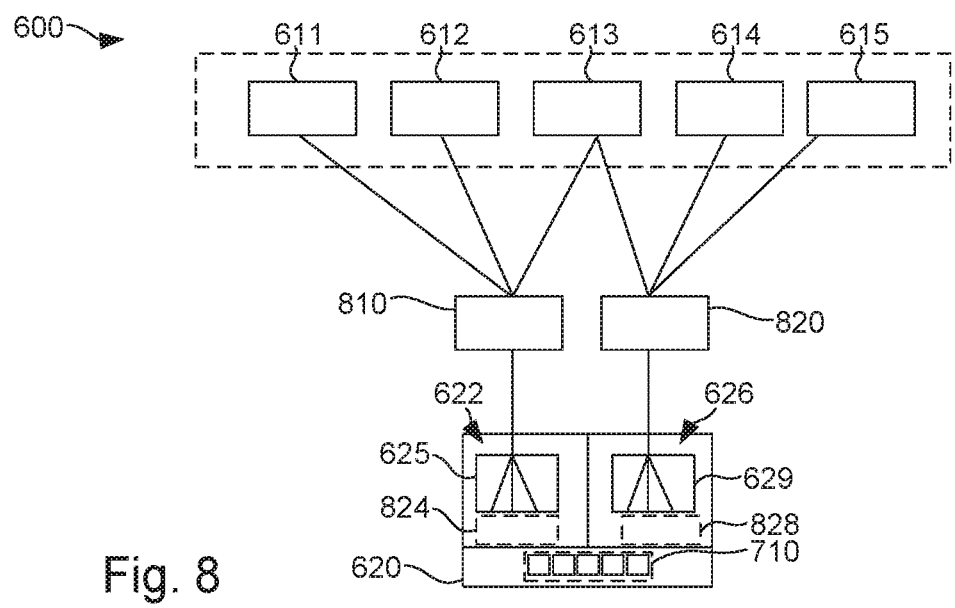
FIG. 8 illustrates another computer network.

FIG. 8 illustrates another computer network 800 different to the example of FIG. 6 in that the computer network 800 comprises two forwarding servers 810 and 820, one for each of the inboxes 622 and 626. Each forwarding server has a different email address. Since the inboxes 622 and 626 now receive all invoices from the same sender address, the processors 625 and 629 cannot determine one single map from the sender address of the message including the invoice. Therefore, the data stores 824 and 828 store references to a subset of multiple maps on the common data store 710, that is the data stores 824 and 828 store references to the maps of all issuers from which the associated recipient expects an invoice. These maps of all issuers form a subset of all available maps and as a result, the processors 625 and 629 each select a different subset of maps based on the sender address that is the address of the forwarding server in this case.

In a different example, the message from the sender has a recipient address and a map or a subset of maps is selected based on the recipient address. This way, all messages that are sent to one recipient are mapped by the map or subset of maps for that recipient. The processors 625 and 629 try to map each of the selected subset of maps to the received invoice as described with reference to FIG. 5. Only the correct map, that is the map associated with the issuer of that invoice, results in no mapping error but extracted data. Similarly, the subset of maps may be selected based on both the recipient address and the sender address.

When an invoice (or other document) arrives into the processing server 110 from a sender, and no map is assigned to that sender that has not been successful in the data extraction method of FIG. 5, the user of the processing server 110 can choose to find an existing map that has been created by another user of the processing server 110, or they can choose to create a new map from scratch.

FIG. 9 illustrates a graphical user interface 900 to start the process for creating a map. It displays a JPEG of an image of the original PDF invoice. If the user selects "create map" 902 the PDF version of the document is converted to XML and then presented as HTML on screen. The HTML is grouped into cells (on the left hand side 904) and they are presented in a visual style that closely or exactly matches the layout of the original invoice.

Figure 10:
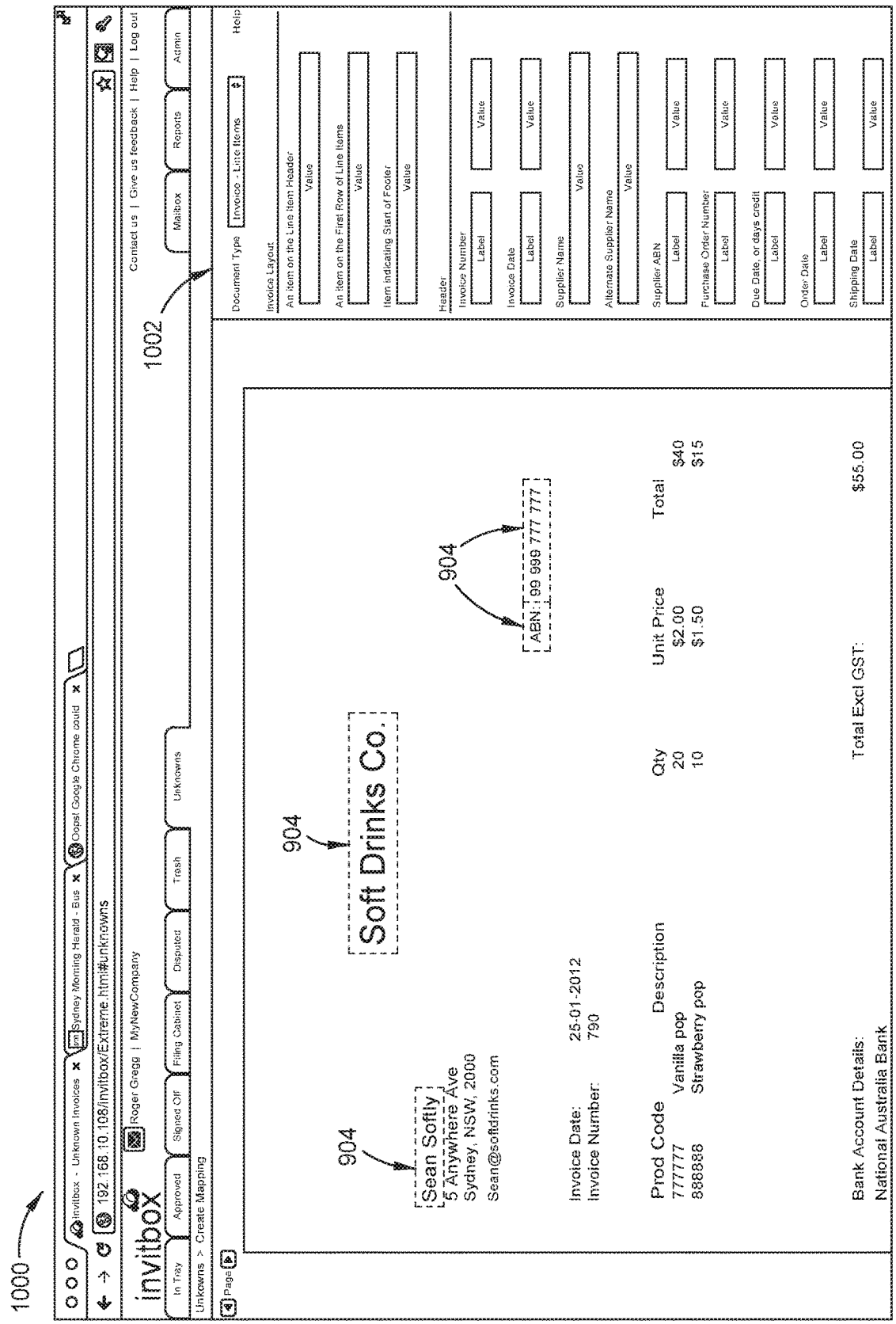

FIG. 10 illustrates a second graphical interface 1000. On the right hand side 1002 of the second graphical interface 1000, to the top, the user first selects one from a selection of mapping assistant templates that define certain document types such as Invoice—Line Item, and Invoice—Service, as examples of a few.

The user is then presented with a series of fields down the right hand side, some of which are requesting to be given information from the cells on the left hand side relating to a value, and some of which are requesting information from the cells on the left hand side relating to a label. Some of these cells require information to be associated with them—they are mandatory and are identified to the user as such.

Figure 11:
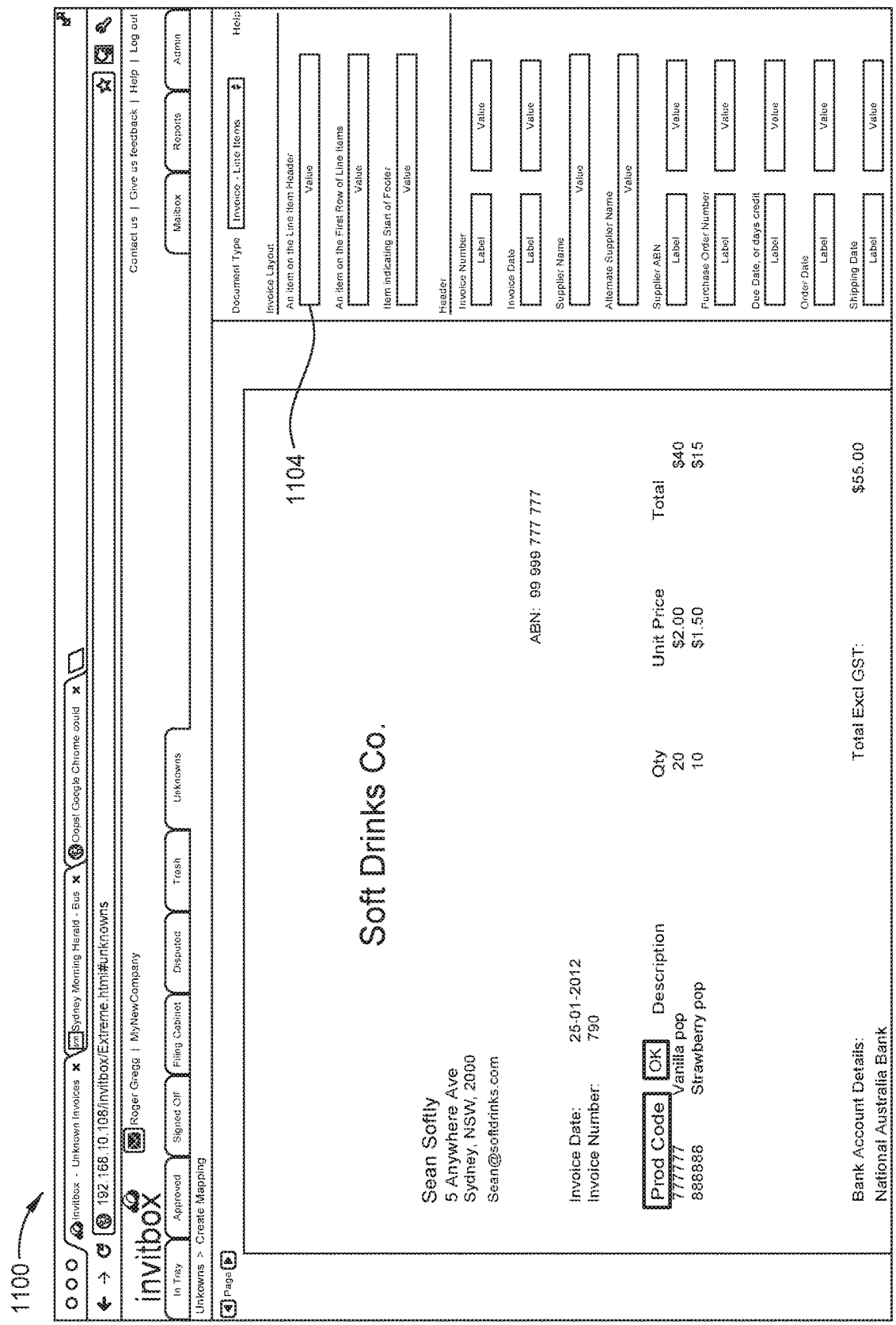

The user then identifies which cell they next want to populate with either a label or a value information. The system is "listening" for cells to be selected on the left hand side. Once a cell is clicked, the entire cell is identified and highlighted, such as by drawing a frame around the cell as illustrated in FIG. 11. By clicking in that cell further, some or all of the content of the cell is then highlighted, and the OK button is activated as illustrated in FIG. 12.

Once the user has identified the entire text string within the cell that they wish to associate with the field, they then click OK, and the string value is allocated to the cell on the right hand side.

The next cell which might accept information is identified (as indicated by reference numeral 1104), but the user can choose to skip forward or backwards through the fields to the left hand side, populating whichever cells they see fit in any order that they see fit.

Once the user has allocated cell information to the fields of their choosing, they either choose to finish, reset or cancel the process as illustrated in FIG. 13.

If they chose to finish the process, the system then takes the information from the client's browser, and runs checks on what has been mapped in order to ensure that the system has been able to extract a minimum mandatory amount of data from the invoice. The information that the system has been able to extract is presented down the right hand side, along with a rendered display of the original invoice once again to allow the user to check one versus the other.

At this stage the user can decide whether to accept the potential mapping results, or they can choose to cancel and return to the previous mapping screen to adjust or add to the potential map as illustrated in FIG. 14.

If they chose to accept the results as illustrated in FIG. 15, they first need to allocate an supplier name to that set of mapping results. This supplier name is for their own internal use. They do this by either allocating that potential map to an existing supplier (by choosing one from the drop down list 1502 in FIG. 15) or they can choose to add a new issuer as illustrated in FIG. 16 by selecting the + button 1504 in FIG. 15.

It is only after they have chosen an existing or assigned an issuer for the potential mapping are they finally able to select OK, which will create the map in the system, and then extract data from the mapped invoice.

This map is now searchable by identifiers that have either been extracted from the invoice through the create map process, or by identifiers which have been added manually in the final 2 steps above.

The map is then stored in the database and associated in the data with the email address that was used to send their invoice into the system. So in future when this particular user receives an invoice from this particular sender email address, this map will be one of the maps used to try to extract data from the invoice. In some embodiments this map may be associated with different email addresses for different issuers.

The invoice in question that was used to create the map is moved through the user's system for their approvals process.

It should be understood that the techniques of the present disclosure might be implemented using a variety of technologies. For example, the methods described herein may be implemented by a series of computer executable instructions residing on a suitable computer readable medium. Suitable computer storage is readable media may include volatile (e.g. RAM) and/or non-volatile (e.g. ROM, disk) memory, carrier waves and transmission media. Example carrier waves may take the form of electrical, electromagnetic or optical signals conveying digital data streams along a local or wide area network or a publicly accessible network such as the internet.

It should also be understood that, unless specifically stated otherwise as apparent from the following discussion, it is appreciated that throughout the description, discussions utilizing terms such as "receiving", "sending", "processing" or "computing" or "calculating", "optimizing" or "estimating" or "determining" or "displaying" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer implemented method for extracting data from an electronic document, the method comprising:
   receiving a message from a sender comprising an electronic document and an electronic address of the sender of the message, wherein each element of the electronic document is associated with a first set of pixel coordinates;
   selecting a subset of maps from a plurality of maps based on the electronic address of the sender and without relying on content from the electronic document by:
      accessing a database storing the plurality of maps stored as XML,
      performing a database query with the electronic address of the sender as a parameter, and
      selecting each map associated with the electronic address of the sender,
   wherein each map of the plurality of maps includes one or more data field definitions, and wherein each data field definition comprises at least a value field and a location;
   selecting a first map from the subset of maps associated with the electronic address of the sender;
   accessing a second set of pixel coordinates associated with the first map;
   determining the second set of pixel coordinates identifies the same location as the first set of pixel coordinates, wherein the first set of pixel coordinates and the second set of pixel coordinates are numerically identical;
   extracting data from the electronic document;
   determining values for each data field of the first map; and
   storing the determined values for each data field in a data store.

2. The computer implemented method of claim 1, wherein the electronic address of the sender is an email address.

3. The computer implemented method of claim 1, wherein the electronic address of the sender is a fax number.

4. A system for extracting data from an electronic document, the system comprising:
   a data store;
   a memory comprising computer-executable instructions; and
   one or more processors configured to execute the computer-executable instructions and cause the system to:
      receive a message from a sender comprising an electronic document and an electronic address of the sender of the message, wherein each element of the electronic document is associated with a first set of pixel coordinates;
      select a subset of maps from a plurality of maps based on the electronic address of the sender and without relying on content from the electronic document by:
         accessing a database storing the plurality of maps stored as XML,
         performing a database query with the electronic address of the sender as a parameter, and
         selecting each map associated with the electronic address of the sender, wherein each map of the plurality of maps includes one or more data field definitions, and wherein each data field definition comprises at least a value field and a location;

select a first map from the subset of maps associated with the electronic address of the sender;

access a second set of pixel coordinates associated with the first map;

determine the second set of pixel coordinates identifies the same location as the first set of pixel coordinates, wherein the first set of pixel coordinates and the second set of pixel coordinates are numerically identical, extract data from the electronic document;

determine values for each data field of the first map; and store the determined values of each data field in the data store.

5. A non-transitory computer-readable storage medium storing instructions that when executed by a computer cause the computer to perform a method for extracting data from an electronic document, the method comprising:

receiving a message from a sender comprising an electronic document and an electronic address of the sender of the message, wherein each element of the electronic document is associated with a first set of pixel coordinates;

selecting a subset of maps from a plurality of maps based on the electronic address of the sender and without relying on content from the electronic document by:
accessing a database storing the plurality of maps stored as XML,
performing a database query with the electronic address of the sender as a parameter, and
selecting each map associated with the electronic address of the sender,
wherein each map of the plurality of maps includes one or more data field definitions, and wherein each data field definition comprises at least a value field and a location;

selecting a first map from the subset of maps associated with the electronic address of the sender;

accessing a second set of pixel coordinates associated with the first map, determining the second set of pixel coordinates identifies the same location as the first set of pixel coordinates, wherein the first set of pixel coordinates and the second set of pixel coordinates are numerically identical;

extracting data from the electronic document;

determining values for each data field of the first map, and storing the determined values for each data field in a data store.

6. The method of claim 1, further comprising: determining that the first map is valid for the electronic document prior to determining the values for each data field of the first map.

7. The method of claim 1, wherein selecting a first map from the subset of maps associated with the electronic address of the sender comprises iterating through the subset of maps to find a map that suits a format of the electronic document.

8. The method of claim 1, further comprising: formatting the determined values into a structured data file of a specific format associated with an application.

9. The method of claim 8, further comprising: transmitting the structured data file comprising the determined values to the application configured to receive files in the specific format.

10. The method of claim 1,
wherein the electronic document is a structured text file comprising a text box associated with a text box location,
and the method further comprises:
comparing a location of a first data field associated with the first map with the text box location; and
ignoring content in the text box if the location of the first data field does not match the text box location.

11. The method of claim 1, further comprising:
determining that a value associated with a particular data field does not match an expected format; and
ignoring the value associated with the particular data field.

12. The system of claim 4, wherein the one or more processors are further configured to cause the system to: determine that the first map is valid for the electronic document prior to determining the values for each data field of the first map.

13. The system of claim 4, wherein in order to select a first map from the subset of maps associated with the electronic address of the sender, the one or more processors are further configured to cause the system to iterate through the subset of maps to find a map that suits a format of the electronic document.

14. The system of claim 4,
wherein the electronic document is a structured text file comprising a text box associated with a text box location,
and the one or more processors are further configured to cause the system to:
compare a location of a first data field associated with the first map with the text box location; and
ignore content in the text box if the location of the first data field does not match the text box location.

15. The system of claim 4, wherein the one or more processors are further configured to cause the system to:
determine that a value associated with a particular data field does not match an expected format; and
ignore the value associated with the particular data field.

16. The method of claim 1, further comprising: determining that the first map is valid for the electronic document prior to determining the values for each data field of the first map.

17. The non-transitory computer-readable storage medium of claim 5, wherein selecting a first map from the subset of maps associated with the electronic address of the sender comprises iterating through the subset of maps to find a map that suits a format of the electronic document.

18. The non-transitory computer-readable storage medium of claim 5, the method further comprising:
formatting the determined values into a structured data file of a specific format associated with an application; and
transmitting the structured data file comprising the determined values to the application configured to receive files in the specific format.

19. The non-transitory computer-readable storage medium of claim 5,
wherein the electronic document is a structured text file comprising a text box associated with a text box location,
and the method further comprises:

comparing a location of a first data field associated with the first map with the text box location; and ignoring content in the text box if the location of the first data field does not match the text box location.

20. The non-transitory computer-readable storage medium of claim 5, the method further comprising:

determining that a value associated with a particular data field does not match an expected format; and ignoring the value associated with the particular data field.

* * * * *